United States Patent
Llorente Gonzalez et al.

(10) Patent No.: US 7,439,714 B2
(45) Date of Patent: Oct. 21, 2008

(54) METHOD FOR OPERATION OF A CONVERTER SYSTEM

(75) Inventors: Jose Ignacio Llorente Gonzalez, Pamplona (ES); Björn Andresen, Ostbirk (DE); Jens Birk, Silkeborg (DK)

(73) Assignee: Gamesa Innovation & Technology, S.L., Pamplona (Navarra) (ES)

(*) Notice: Subject to any disclaimer, the term of this patent is extended or adjusted under 35 U.S.C. 154(b) by 141 days.

(21) Appl. No.: 11/528,491

(22) Filed: Sep. 27, 2006

(65) Prior Publication Data
US 2007/0073445 A1    Mar. 29, 2007

(30) Foreign Application Priority Data
Sep. 27, 2005  (ES)  ............................... 200502337

(51) Int. Cl.
*H02J 7/00* (2006.01)
*H02M 7/00* (2006.01)

(52) U.S. Cl. .............................. 322/24; 363/71; 363/35

(58) Field of Classification Search .................. 322/22, 322/23, 24, 99; 363/35, 71, 65
See application file for complete search history.

(56) References Cited

U.S. PATENT DOCUMENTS

| | | | |
|---|---|---|---|
| 5,943,229 A * | 8/1999 | Sudhoff | 363/125 |
| 6,487,096 B1 * | 11/2002 | Gilbreth et al. | 363/35 |
| 6,972,972 B2 * | 12/2005 | Duncan et al. | 363/56.01 |
| 7,046,527 B2 * | 5/2006 | West | 363/41 |
| 7,072,194 B2 * | 7/2006 | Nayar et al. | 363/71 |

* cited by examiner

*Primary Examiner*—Nicholas Ponomarenko
(74) *Attorney, Agent, or Firm*—Ladas & Parry LLP

(57) ABSTRACT

The present invention relates to a method for operating a converter system of a wind turbine, wherein the converter system includes converter modules capable of converting electric power produced by a generator to electric power applicable to a utility grid. The converter modules include generator inverters and grid inverters. The method determines the enabling/disabling of the converter modules in response to a parameter related to the variable amount of electric power being produced by the generator. Advantages of the present invention are optimisation of power efficiency of the converter modules and improved reliability of the converter modules. Another advantage is the capability of fast enabling and disabling of the converter modules.

24 Claims, 2 Drawing Sheets

METHOD FOR OPERATION OF A CONVERTER SYSTEM

FIELD OF THE INVENTION

The present invention relates to the field of electric power generation of a utility grid connected wind turbine, and specifically to wind turbines and electric power converter systems comprising converter modules for supplying the electric power to the utility grid.

BACKGROUND OF THE INVENTION

A first aspect of wind turbines relates to electric power efficiency of the converter system. Even a small improvement of the power efficiency may be significant for the profitability of the investment in wind turbines due to increased power production.

A second aspect of wind turbines relates to the reliability of the converter system. Improved reliability of the converter system increases the reliability of the wind turbine, thus increasing the mean-time-between-failure (MTBF) of the wind turbine. The increase of the mean-time-between-failure consequently decreases service costs and increases the power production over time, which is important for the profitability of the investment in wind turbines.

WO 2004/030189 discloses power conversion units (PCU's) adapted to convert power from the first form to other forms suitable for use by the components of the destinations system. The power sources can include a variety of power generating devices, such as a wind turbine. The power, after having been converted, is supplied to one or more variable loads of the destination system. These variable loads can represent the power requirement from the operation of a motor, a servo, an electric circuit and the like. The operation of the system may include activating/deactivating one or more of the PCU's in response to an increase/decrease in the consumption of power by the destination system. By deactivating a PCU during periods of lower power consumption, an improvement of the overall efficiency of the power distribution system is obtained. However, WO 2004/030189 neither considers how to improve the mean-time-between-failure of the power conversion units, nor does it consider how to manage changes in the produced amount of electric power being inputted to PCU's, and thus, WO 2004/030189 does not consider how to improve the efficiency of the PCU's in a system wherein the amount of power being input to the PCU's is not constant over time.

SUMMARY OF THE INVENTION

It may be an object of the present invention to provide a method to optimize the electric power efficiency of a wind turbine by the use of an electric converter system with improved electric power conversion efficiency. It may supplementary or alternatively be seen as an object of the present invention to provide a method for improving the reliability of a wind turbine by the use of an electric converter system with improved reliability.

One or more objects of the invention may be obtained by applying a method for operating a converter system of a wind turbine, said converter system comprising a plurality of converter modules capable of converting a variable amount of electric power produced by a generator to electric power applicable to a utility grid, wherein
  said plurality of converter modules being configured in parallel, and wherein the method comprises the step of
  determining an enabling/disabling procedure of at least one of the converter modules in response to a parameter related to the variable amount of electric power being produced by the generator.

The invention is particularly, but not exclusively, advantageous for improving the efficiency of the production of electric power of a wind turbine as well as improving the reliability of an electric power converter system, thus lowering the mean-time-between-failure of a wind turbine.

The plurality of converter modules capable of converting a variable amount of electric power produced by a generator to electric power applicable to a utility grid may comprise generator inverters and grid inverters. Alternatively, the converter modules may comprise matrix converters characterised by having neither separate generator inverters nor separate grid inverters and consequently having no DC-link.

The parameter related to the variable amount of electric power being produced by the generator may be one or more of the following: temperatures of components of the converter module, a power reference (Sref) being the reference for the apparent power to the converter system, a power reference (Pref) being the reference for the active power to the converter system, a current reference (Iref) being a current reference to the converter system, a measured value (Smes) of the apparent power produced by the generator or the apparent power delivered to the grid, a measured value (Pmes) of the active power produced by the generator or the active power delivered to the grid, and a measured value (Imes) of the current produced by the generator or the current delivered to the grid.

In a preferred embodiment of the invention, the disabling of at least one of the converter modules may be a short term disabling or a long term disabling.

The said short term disabling is characterised by the property of allowing a fast enabling of the converter module having been disabled for an expected short time. The duration of a fast enabling may be defined relative to the time required for operating contactors, such as mechanical contactors. A situation where a short time disabling may be preferred, may be caused by variations in the wind speed, causing variations in the amount of energy produced by the generator, and thus when a decrease in the produced energy is measured or expected, a converter module may be short-time disabled, with the advantage that the short-time disabling allows a fast enabling when an increase in the produced energy is measured or expected. It is an advantage to be able to disable the converter module for only an expected short time, because the short time disablement has the capability to enable the converter module very fast, and thereby avoiding lost production of electric power due to a slow enabling of the converter module.

As well as being able to disable the converter module for a short time period, it is also possible to disable the converter module for a long period of time, wherein the duration of a long time disabling may be defined relative to the short time disabling. The long time disablement may be an advantage when it is expected that the converter module need not to be enabled for a longer period. Furthermore, the long time disablement may be an advantage because the mean-time-between-failure (MTBF) of a converter module will increase when it is disabled for long period of time because no voltages are applied to the transistors and capacitors of the converter module. A situation in which a long time disablement is preferred may arise when no variation in the wind speed is expected for a longer period of time, or when a converter module needs to be repaired or replaced.

In a possible embodiment of the invention the step of enabling/disabling at least one of the plurality converter modules may be carried out so that the output power of each of the enabled converter modules, or at least of some of the converter modules, is maximised relative to a rated power of the converter modules. When the electric power being outputted from a converter module is maximised relative to the rated power of the converter module, the electric power conversion efficiency of the converter module is also maximised, thus maximising the power production of the wind turbine, which is an advantage of the profitability of the investment in the wind turbine.

In another possible embodiment of the invention, the enabling/disabling of at least one of the plurality of converter modules may be carried out so that the thermal cycling, i.e. the temperature changes over time of the electronic components, of each of the converter modules, or at least of some of the converter modules, is minimised, e.g. in relation to the normal operative temperatures, or in relation to the maximum allowable operative temperatures, or in relation to the maximum allowable temperature variations. This is an advantage since the thermal cycling of a converter module is damaging to the converter module. Thus, a minimising of the thermal cycling will improve the reliability of the converter module, and thereby reduce the number of failures of the converter module.

According to one method according to the invention of enabling/disabling in response to thermal cycling, the enabling/disabling is carried out so that the thermal cycling of each of the plurality of converter modules, or at least of some of the plurality of converter modules, is minimised within a selected range of temperature when operating the converter modules, possibly carried out so that the temperature amplitude of thermal cycling of each enabled converter modules is minimised.

The minimising of the temperature amplitude of thermal cycling is preferably carried out relative to an interval of temperatures between 0 and 125 degrees Celsius, preferably relative to an interval of temperatures between 30 and 125 degrees Celsius, more preferably relative to an interval of temperatures between 60 and 125 degrees Celsius, or even more preferably relative to an interval of temperatures between 60 and 110 degrees Celsius.

According to another either alternative or additional method according to the invention of enabling/disabling in response to thermal cycling, the enabling/disabling is carried out so that the thermal cycling of each of the plurality of converter modules, or at least of some of the plurality of converter modules, is minimised within a selected range of temperature when operating the converter modules, possibly carried out so that the frequency of the thermal cycling of each enabled converter modules is minimised, wherein the minimising of the frequency of the thermal cycling preferably is carried out relative to a maximum allowable frequency.

The requirement of both maximising the output power of at least one of the enabled converter modules relative to a rated power of the converter modules, and minimising the thermal cycling of at least one of the converter modules may not be achievable in some situations. A method wherein both the output power of a converter module is maximised or at least partly maximised and wherein the thermal cycling is minimised or at least partly minimised may be obtained by calculating a single parameter and optimising that single parameter relative to a preset value, wherein said single parameter may be characteristic of both the output power relative to a rated power of a converter module and the thermal cycling of a converter module.

In a preferred embodiment of the invention, the enabling/disabling of at least one of the converter modules may be carried out so that the Pulse-Width-Modulation (PWM) patterns of two or more converter modules are phase shifted relative to each other. Thus, when 2 converter modules are enabled the Pulse-Width-Modulation (PWM) patterns may be phase shifted with 180 degrees relative to each other, when 3 converter modules are enabled the Pulse-Width-Modulation (PWM) patterns may be phase shifted with 120 degrees relative to each other so that the PWM pattern of a second converter module is phase shifted with 120 degrees relative to a first converter, and the PWM pattern of a third converter module is phase shifted with 240 degrees relative to the first converter module. Similarly, when 4 converter modules are enabled the Pulse-Width-Modulation (PWM) patterns may be phase shifted with 90 degrees relative to each other. When 5 or more converter modules are enabled the Pulse-Width-Modulation (PWM) patterns may be phase shifted according to the examples given above wherein 2, 3 or 4 converter modules are enabled. When the Pulse-Width-Modulation (PWM) patterns of two or more converter modules are phase shifted with respect to each other, the harmonic components originating from the Pulse-Width-Modulation (PWM) are reduced, thereby improving the quality of the voltage signal being applied to the utility grid.

In another preferred embodiment of the invention, the criteria for enabling/disabling at least one of the converter modules may be determined from predetermined hysteresis parameters, wherein the hysteresis parameters are influenced by the temperature of components of the wind turbine and/or the ambient temperature. When the temperature of components of the wind turbine, such as the converter module, the heat-sinks of a converter module, the grid chokes, the generator chokes, the brake chopper resistors, IGBT modules, cabinets or the generator becomes too high in respect of normal operative temperatures or in respect of maximum operative temperatures, it may be beneficial to change the enabling and/or disabling limits of the converter modules so that each converter module outputs a smaller amount of electric power, thereby reducing the temperature of any of the overheated components of the wind turbine. The ambient temperature may also be taken into account when adapting the enabling and/or disabling limits in order reduce the temperature of overheated components of the wind turbine.

Conversely, if the temperatures of some or all of some components of the wind turbine and/or the ambient temperature are low in respect of normal operative temperatures or in respect of maximum operative temperatures, it may be beneficial to change the enabling and/or disabling limits of the converter modules. A change of the enabling and/or disabling limits will increase the temperatures of the components of the wind turbine within an allowable range and simultaneously increase the power efficiency of the wind turbine. An example of maximum operative temperatures of components of the wind turbine, such as the IGBT modules, may be 125 degrees Celsius.

In a preferred embodiment, at least one of the converter modules may be enabled by enabling the generator inverter and the grid inverter, which provides an easy and fast way to enable a converter module since only an a change in the electronic signals applied to the generator inverter and the grid inverter is required.

Similarly, at least one of the converter modules may be disabled for short periods of time by disabling the generator inverter and/or the grid inverter, which requires only a change in the electronic signals applied to the generator inverter and the grid inverter.

In another preferred embodiment of the invention, at least one of the converter modules are enabled by enabling the converter module according to a sequence of enabling procedures. According to the sequence of enabling procedures, the enabling may either start from an off-state, which is a state for long term disablement of the converter module, or the enabling may start from an ready-state, which is a state for short term disablement of the converter module.

Similarly, at least one of the converter modules may be disabled for longer periods of time by disabling the converter module according to a sequence of disabling procedures, wherein the sequence of disabling procedures provides a predictable method for disabling the converter module such as known from state machines.

One or more objects of the invention may also be obtained by a wind turbine intended for being connected to the utility grid and intended for operating with a converter system of a wind turbine system, said wind turbine system comprising a plurality of converter modules capable of converting a variable amount of electric power produced by a generator to electric power applicable to a utility grid, wherein said plurality of converter modules being configured in parallel, and said wind turbine system comprising means for determining an enabling/disabling of at least one of the plurality of converter modules in response to a parameter related to the variable amount of electric power being produced by the generator.

It is an advantage that the wind turbine system may comprise disabling and/or enabling means such as generator inverters and/or grid inverters for short term disabling and/or enabling of the converter modules. The disabling and/or enabling may be achieved by applying disabling/enabling signals to the generator inverters and/or grid inverters. The wind turbine may also comprise disabling and/or enabling means such as matrix converters also being capable of fast disabling and/or fast enabling by applying disabling/enabling signals to the matrix converter.

It is another advantage that the wind turbine system may comprise means such as contactors for disconnecting the converter module from the generator and the utility grid for the purpose of long term disabling of the converter modules.

In relation to the above-mentioned advantages, it is an advantage that the wind turbine system may comprise means such as phase shifters for phase shifting the Pulse-Width-Modulation (PWM) patterns of the enabled converter modules.

In a preferred embodiment the wind turbine may comprise DC link capacitors for smoothing out variations of a DC signal, and charge resistors for charging a DC link capacitor.

These and other aspects of the invention will be apparent from and described more in detail with reference to drawings and the embodiments described hereinafter.

DETAILED DESCRIPTION OF AN EMBODIMENT

Figure 1:
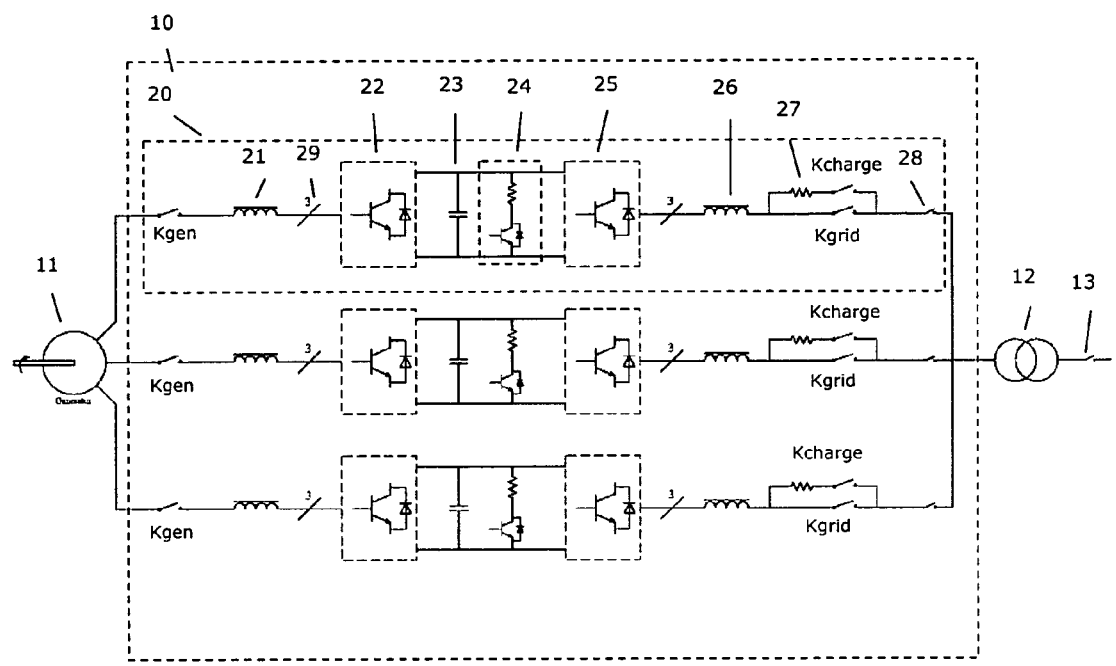
FIG. 1 schematically illustrates a generator connected to a converter system according to the invention and the converter system being connected to the utility grid.

FIG. 1 illustrates a converter system 10 comprising 3 converter modules 20 connected in parallel. FIG. 1 also illustrates a generator 11 of the wind turbine, a transformer 12 connecting the output from the converter system 10 to the utility grid and a circuit breaker 13.

The converter module 20 comprises a generator contactor Kgen for disconnecting the generator from the electronics of the converter module 20. The converter module also comprises an inductor 21 for smoothing the generator current, a generator inverter 22 for transforming the AC signal from the generator 11 to a DC signal, a DC link capacitor 23 for smoothing out variations of the DC signal, a brake chopper 24 for dissipation of residual power, a grid inverter for transforming the DC signal to an AC signal, and an inductor 26 which in combination with capacitors (not shown) serves to reduce harmonics of the voltage signal being applied to the utility grid. The converter module 20 further comprises a charge resistor 27 for charging the DC link capacitor 23 when the contactor Kcharge is closed, a grid contactor Kgrid for disconnecting the utility grid from the electronics of the converter module 20, and a circuit breaker 28 for disconnecting the utility grid from the converter module 20 in case of an overcurrent. The symbol indicated with numeral 29 indicates in this example that the converter module is a 3-phase system, however, the principle of the converter module 20 works equally well for other systems, such as one phase systems.

The converter system 10 illustrated in FIG. 1 comprises 3 converter modules 20, however, the converter system 10 may comprise any plurality of converter modules 20, i.e. any number of 2 or more converter modules 20.

Before the converter module 20 is capable of supplying electric power to the utility grid, the converter module 20 must be enabled by transition from an initial deactivated off-state of the converter module 20 to a final fully operable run-state. The transition from the off-state to the run-state includes transitions to a number of intermediate transitory states and fixed states as will be described in the following. The transitory states are states wherein the converter module 20 can stay for a short time (up to a few seconds), and the fixed states are states wherein the converter module can stay, in principle, for an infinite period of time. The transitions between the different states of the converter module 20 are controlled by a control unit, such as a Central Processing Unit (CPU).

In the initial off-state, all contactors Kgen, Kgrid and Kcharge are open and the state of the circuit breaker 28 is unchanged, thus the circuit breaker 28 may be open or closed depending of the state of the circuit breaker 28 prior to the off-state. The generator inverter 22 and the grid inverter 25 are both disabled.

The next state of the converter module 20 is a transitory pre-charge-state, wherein firstly the circuit breaker 28 is closed, if it was initially open, and then the contactor Kcharge is closed in order to charge the DC-link capacitor 23 through the charge resistor 27 and the freewheeling diodes of the grid inverter 25 to the peak value of the of the grid voltage, that is if the root-mean-square voltage of the grid is as example 690 V the DC-link capacitor will be charged to 975 V.

The subsequent state of the converter module 20 is a fixed ready-state, wherein firstly the contactors Kgen and Kgrid are closed and Kcharge is opened. In the fixed ready-state, the voltage of the DC-link capacitor 23 is maintained at the peak voltage of the grid voltage so that the converter module 20 is prepared to start converting electric power from the generator 11 to the utility grid.

From the ready-state, the state of converter module 20 is shifted to the transitory switchcharge-state, wherein the grid inverter 25 is enabled and the DC-link capacitor 23 is charged to a rated voltage exceeding the previous voltage, e.g. the voltage may be increased to a voltage of 1050 V.

From the transitory switch-charge-state, the state of the converter module 20 is shifted to the fixed DC-link-on-state, wherein the voltage of the DC-link capacitor is kept constant.

After the DC-link-on-state, the converter module 20 can be shifted to the transitory startgenerator-inverter-state, wherein the generator inverter 22 is enabled.

The subsequent state is the fixed run-state, wherein the grid inverter 25 is controlled according to the DC-link voltage and the reactive power reference. The generator inverter 22 is controlled according to the power reference from the turbine controller.

The ready-state provides a possibility for fast enabling and disabling of the converter module 20, that is when the converter module 20 is in the run-state supplying power to the utility grid, it is possible to disable the converter module 20 very fast by changing the state from the run-state to the ready-state by disabling the generator inverter 22 and the grid inverter 25. Similarly, it is possible to enable the converter module 20 very fast, if the converter module is in the ready-state, by enabling the grid inverter 25 and the generator inverter 22. Thus, none of the contactors Kgen, Kgrid and Kcharge need to be operated in order to disable or enable the electric power conversion of the converter module 20, thereby providing a method for enabling or disabling of the converter module 20 very fast, that is the duration of a fast enabling or a fast disabling may be in the range from 10-100 msec. Furthermore, the ready-state, requires no operations of the contactors Kgen, Kgrid and Kcharge when fast disabling or fast enabling any of the plurality of converter modules 20, thus an advantageous effect in relation to the ready-state is that the Mean-Time-Between-Failure (MTBF) of a converter module 20 is increased.

The generator inverter 22 and the grid inverter 25 can be enabled by applying enabling electric signals, such as the Pulse-Width-Modulation voltage signals, to the generator inverter 22 and the grid inverter 25, for instance by applying said electric enabling signals to the gate of transistors, such as IGBT transistors, of the generator inverter 22 and the grid inverter 25. Similarly, the generator inverter 22 and the grid inverter 25 can be disabled by applying electric disabling signals, such as signals with a zero voltage, to the generator inverter 22 and the grid inverter 25, for instance by applying said electric disabling signals to the gates of the transistors of the generator inverter 22 and the grid inverter 25.

A generator inverter 22 may include a number of 6 IGBT transistors. The generator inverter 22 is controlled by applying voltages, e.g. voltages between 0V and 15V, to the gates of the IGBT transistors. If a voltage signal of 0V is applied to the gates of the 6 IGBT transistors then no current will flow in the IGBT transistors and consequently the generator inverter 22 will be disabled. If voltage signals, such as Pulse-Width-Modulation voltage signals with voltage levels of e.g. 0 and 15 V are applied to the 6 IGBT transistors the generator inverter 22 will be enabled. The enabling and disabling of the grid inverter 25 by means of applying Pulse-Width-Modulation voltage signals and zero voltage signals is equivalent to the enabling and disabling of the generator inverter 22 as described above.

The reverse transition from the run-state to the off-state is achieved by initially ramping the power reference to the generator 11 to zero, where the power reference controls the power produced by the generator 11. When this has been achieved the generator currents are zero and the generator inverter 22 can be disabled and the contactor Kgen can be opened. Then the DC-link reference is kept constant, i.e. the voltage of the DC-link capacitor 23 is kept contact, and the reactive power reference applied to the grid inverter control is ramped towards zero. Subsequently, the grid currents from the grid inverter 25 will be zero and the grid inverter 25 can be disabled and Kgrid can be opened.

The duration of a transition from the run-state to the off-state, or the duration of the opposite transition from the off-state to the run-state may be in the range from 1-10 sec. The example described above for transition from the off-state to the run-state only illustrates one embodiment among other embodiments wherein other states may be included in the sequence of states. Accordingly, other states may be added prior to or subsequent to the sequence of states described above. Also, some or all of the states described above may be grouped in alternative states, that is the pre-charge-state, the ready-state and the switch-charge-state may be grouped into to one charge-state. Furthermore, some of the states may be skipped in some instances, e.g. the DC-link-on state may be skipped in the transition from the switch-charge-state to the start-generator-inverter-state.

It is possible to improve the electric power efficiency of the converter system 10 by ensuring that each converter module 20 is operated closely to the rated power level of the converter module 20 in question. The rated power level of the converter module should be understood as the maximum electric power that the converter module is capable of outputting at a given temperature. For instance, if the converter module 20 is outputting electric power equal to 100% of the rated output power, the efficiency of the converter module may be 97.5%, whereas, if the converter module 20 is outputting electric power equal to 20% of the rated output power, the efficiency of the converter module may be 95.7% corresponding to a decrease in efficiency of 1.8%.

Therefore, in order to achieve the best converter efficiency, the number of enabled converter modules 20 must be adapted to the actual amount of electric power produced by the generator 11. Thus, if the generator only produces 50% of the rated power capability of the converter system 10, wherein the rated power of the converter system 10 is equal to the sum of the rated power levels of all converter modules 20 comprised by the converter system 10, then ideally half of the converter modules 20 should be enabled in order to maximise the efficiency of the converter system 10.

Figure 2:
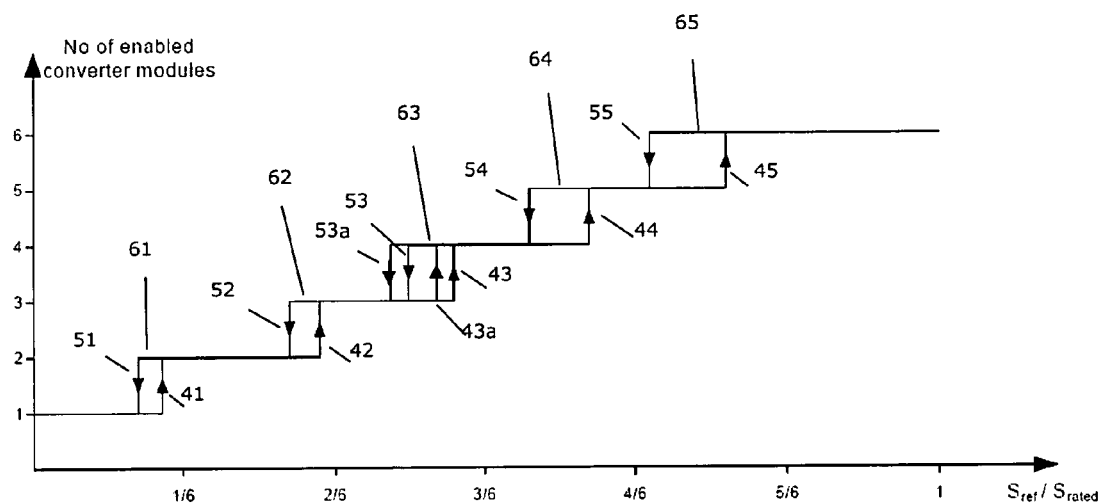
FIG. 2 illustrates a graphical representation of a method according to the invention for deciding whether a converter module should be enabled or disabled.

FIG. 2 shows a graphical representation for determining the number of converter modules (along the ordinate) that should be enabled as a function of the ratio between a parameter Sref and the rated apparent power level Srated (along the abscissa) of the converter system 10. The graph shown in FIG. 2 is valid for a converter system 10 with 6 converter modules 20. The parameter Srated is the rated apparent power level of the converter system 10. The parameter Sref is the reference for the apparent power to the converter system 10 and Sref is equated as the square root of sum of squares of the active power and the reactive power. Thus, the parameter Sref is related to the variable amount of electric power produced by the generator, which is related to the losses of electric power in the converter modules 20, where the losses causes temperature increases of the converter modules 20. The temperature increase in a converter module caused by the electric loss is determinative for the rated power of the converter module 20, and thus, the related parameter Sref is a representative parameter for determining the enabling or disabling of the converter module 20.

Other parameters may be used instead of Sref, such as Pref being the reference for the active power to the converter system 10 or Iref being a current reference to the converter system 10. Furthermore it is also possible to use the measured values of the apparent power Smes produced by the generator 10 or delivered to the grid, measured values of the active power Pmes produced by the generator 10 or delivered to the grid, or measured values of the current Imes produced by the generator 10 or delivered to the grid. It is also possible to use the temperatures of components of the converter module, such as the IGBT transistors or heat sinks of the converter modules 20. Any of the above-mentioned parameters (Sref, Pref, Iref), and measurements (Smes, Pmes, Imes), and temperatures may be combined into a single parameter that may be used instead of the parameter Sref as described in relation to FIG. 2.

The curve 40 illustrated in FIG. 2 shows the enabling limits 41-45, in form of the ratio Sref/Srated, for enabling of a converter module 20, and the disabling limits 51-55 for the disabling of a converter module 20. Thus, when the ratio Sref/Srated is below a certain value, which is equal to or smaller than the enabling limit 41, e.g. with a value of 1/6 or slightly less than 1/6 such as 5/60 or 8/60, then only one converter module 20 needs to be enabled. It should be understood that the enabling limit 41 equal to 1/6 corresponds to 100% of the rated power of a converter module 20, and consequently the enabling limit 41 equal to 5/60 corresponds 50% of the rated power of the converter module 20, and the enabling limit 41 equal to 8/60 corresponds 80% of the rated power of the converter module 20. When the ratio Sref/Srated increases above a certain enabling limit, e.g. given by the enabling limit 41, due to an increase of the power produced by the generator 11, another converter module 20 is enabled so that a total of 2 converter modules are enabled. If the ratio Sref/Srated subsequently decreases below as certain disabling limit, e.g. limit 51, due to a decrease of the power produced by the generator 11, then one converter module 20 is disabled so that only one converter module is enabled, thereby maintaining a high electric power efficiency of the converter system 10. Typical values for the enabling limit 41 is approximately equal to 90% of the rated power of a converter module 20, or possibly 80%, or even 50% of the rated power of a converter module 20. Typical values of the disabling limit 51 is 80% of the rated power of a converter module 20 or possibly 70%, or even 40% of the rated power of a converter module 20. The hysteresis band 61 given as the difference between the enabling limit 41 and the disabling limit 51 ensures that enabling and disabling of the converter modules 20 does not occur too often due to minor variations in the electric energy produced by the generator 11.

The hysteresis bands 61-65, given as the differences between the enabling limits 41-45 and the disabling limits 51-55 may be adapted to increase as a function of the increasing values of Sref/Srated as shown in FIG. 2, which ensure that enabling and disabling of the converter modules 20 does not occur too often even when variations in the electric energy produced by the generator 11 increases.

When the ratio Sref/Srated increases further above the enabling limit 42, a third converter module 20 is enabled, and if the ratios Sref/Srated decreases below the disabling limit 52 a converter module will be disabled. When the ration Sref/Srated increases above the enabling limit 45, the sixth and last converter module 20 will be enabled.

In other embodiments according to this invention, more or less converter modules may be used, which requires a corresponding change in the number of enabling limits 41-45 and disabling limits 51-55.

The enabling limits 41-45 and the disabling limits 51-55 may be made dependent on temperature in order to avoid overheating and thereby failure of the converter modules 20. For instance, if the temperature of a converter module 20 increases above a certain limit due to increases in the ambient temperature, it may be necessary to shift the enabling limits 41-45 to lower values of the ratio Sref/Srated, e.g. the enabling limit 43 may be shifted to the enabling limit 43a as shown in FIG. 2.

Thus, when some or all of the enabling limits 41-45 of the converter modules 20 have been shifted, e.g. from 90% to 85% of the rated power of the converter module 20, the average electric power being outputted from a converter module 20 will correspondingly be lower since more converter modules will be enabled thereby reducing the temperature of a converter module 20.

The enabling limits 41-45 and the disabling limits 51-55 may be dependent on temperatures of any of the components of the converter system, for instance the temperatures of heat sinks, resistors, transistors, cabinets, grid chokes, generator chokes and brake chopper resistors. Also, the enabling limits 41-45 and the disabling limits 51-55 may be dependent on temperatures of the generator 11 and may also be dependent on the ambient temperature.

Some or all of the disabling limits 51-55 may be reduced correspondingly to the reduction of the enabling limits 41-45, e.g. by reducing the disabling limit from 80% to 75% of the rated power of the converter module 20, thereby maintaining the size of the hysteresis band to be equal to e.g. 10% of the rated power of the converter module 20.

Similarly, the enabling limits 41-45 and/or the disabling limits 51-55 may be increased, so that some or all of the converter modules are capable of outputting larger electrical powers. The situation of increasing the enabling limits 41-45 and/or the disabling limits 51-55 may occur if the temperature of a converter module 20 decreases, e.g. due to a decrease of the ambient temperature or due to a decrease in the temperature in any of the components; heat sinks, resistors, transistors, cabinets, grid chokes, generator chokes, brake chopper resistors and the generator 11. Also, the enabling limits 41-45 and/or the disabling limits 51-55 may be increased temporarily to handle short time increases in the produced electric power from the generator 11.

Also, the rated power levels of the converter modules may be made dependent on temperatures of any of the components of the converter system, for instance the temperatures of heat sinks, resistors, transistors, cabinets, grid chokes, generator chokes and brake chopper resistors. Also, the rated power levels may be made dependent on temperatures of the generator 11 and the ambient temperature. Clearly, making the rated power levels dependent on temperature is equivalent to making the enabling limits 41-45 and the disabling limits 51-55 dependent on temperature.

The grid inverter 23 may be based on Pulse-Width-Modulation (PWM). It is possible to reduce the harmonics generated by the Pulse-Width-Modulation technique by ensuring that the Pulse-Width-Modulation (PWM) patterns of two or more converter modules 20 are phase shifted relative to each other. Thus, when 2 converter modules 20 are enabled the Pulse-Width-Modulation (PWM) patterns may be phase shifted with 180 degrees relative to each other, when 3 converter modules 20 are enabled the Pulse-Width-Modulation (PWM) patterns may be phase shifted with 120 degrees relative to each other so that the PWM pattern of a second converter module 20 is phase shifted with 120 degrees relative to a first converter module 20, and the PWM pattern of a third converter module 20 is phase shifted with 240 degrees relative to a first converter module 20. Similarly, when 4 converter modules 20 are enabled the Pulse-Width-Modulation (PWM) patterns may be phase shifted with 90 degrees relative to each other. When 5 or more converter modules 20 are enabled the Pulse-Width-Modulation (PWM) patterns may be phase shifted according to the examples given above wherein 2, 3 or 4 converter modules 20 are enabled. Thus, by phase shifting the Pulse-Width-Modulation signals applied to the converter modules 20 an improvement of the quality of the voltage signal being applied to the utility grid is achieved.

Taking into account the situation where at least 2 converter modules should be enabled in order to reduce the harmonics generated by the Pulse-Width-Modulation technique, the curve of FIG. 2 should be adapted so that the curve starts with 2 enabled converter modules 20 when Sref is equal to 0, and the third converter is enabled when the ratio Sref/Srated exceeds above the enabling limit 42.

When the output of the converter system is connected to a strong utility grid, it may not be necessary to enable the at least 2 converter modules 20 for reducing the harmonic voltage components caused by the pulse-width-modulation, because the strong utility grid has the capability to suppress such harmonic voltage components. In such cases, only one converter module 20 needs to be enabled when the ratio Sref/Srated is greater than zero and smaller than the enabling limit 41 shown in FIG. 2.

The reliability of the converter modules 20 can be improved by considering the temperatures of the converter modules 20 and the operational hours of the converter modules when enabling and disabling converter modules. Reliability of the converter modules 20 should be understood as a characterisation of such characteristics as the mean-time-between-failure (MTBF) of the converter modules.

The reliability of a converter module 20 is decreased by thermal cycling of the converter module, for instance due to thermal cycling of electric components, such as IGBT transistors, of the converter modules. The thermal cycling of the electric components affects the lifetime of the converter modules in a negative way, thereby decreasing the reliability of the converter module 20. The thermal cycling of the electric components should be understood as temperature changes over time of the electronic components. Keeping the temperature of the electronic components of a converter module 20 constant or reducing the temperature variations over time will improve the reliability of the converter module 20 in question.

The thermal cycling of the converter module 20 may be minimised by reducing the temperature variations of e.g. the IGBT transistors relative to an interval of operating temperatures of the IGBT transistors, such as in the range of 0-125 degrees Celsius, preferably in the range from 30-125 degrees Celsius, more preferably in the range from 60-125 degrees Celsius or even more preferably in the range from 60-110 degrees Celsius. Alternatively, the thermal cycling may be minimised relative to an average temperature of the IGBT transistors.

When the ratio Sref/Srated increases above the enabling limit 42 in FIG. 2, a third converter module 20 will be enabled. However, in the case where the converter system 10 comprises 6 converter modules 20, the third converter module 20 to be enabled could be any of the 4 disabled converter modules. In order to decrease the thermal cycling of the converter modules, the third converter module to be enabled is selected to be the one of the 4 disabled converter modules having the highest temperature at the time of enabling. By enabling the converter module 20 having the highest temperature, the thermal cycling will be minimised, and thereby increasing the reliability of the converter system 10.

Conversely, if the ratio Sref/Srated decreases below the disabling limit 43 in FIG. 2, one of the 3 enabled converter modules 20 must be disabled. In order to decrease the thermal cycling of the converter modules, the converter module to be disabled is selected to be the one of the 3 enabled converter modules having the lowest temperature at the time of disabling. By disabling the converter module 20 having the lowest temperature, the thermal cycling will be minimised, thereby increasing the reliability of the converter system 10.

The temperature of the converter modules 20 used for determining which one of the converter modules 20 should be enabled or disabled could be obtained by measuring the temperature of critical electrical components, such as IGBT transistors, or by measuring the temperature of heat sinks of the converter module 20, or by measuring the temperature of any other component of the converters modules 20.

The reliability of the converter modules 20 is also affected by the operational hours of a converter module 20, wherein the operational hours of a converter module 20 should be understood as the number of hours that a converter module 20 has been enabled. Thus, if a converter module 20 is enabled very infrequently, the reliability of that converter module will be high, whereas the reliability of another converter module 20 that is enabled frequently is lower.

Therefore, a solution for increasing the reliability of the converter modules 20 and the converter system 10 as such, is to minimise the number of operational hours of each converter module 20 by ensuring that the operational hours of each of the converter modules 20 of the converter system 10 are approximately equal.

Thus, when the ratio Sref/Srated increases above e.g. the enabling limit 42, the one of the disabled converter modules 20 with the smallest number of operational hours will be enabled. Oppositely, when the ratio Sref/Srated decreases below e.g. the disabling limit 55, the one of the enabled converter modules 20 with the largest number of operational hours will be disabled.

A conflict may arise when deciding which one of the enabled/disabled converter modules 20 to disable/enable because the criteria for minimising both the thermal cycling and the operational hours may point on two different converter modules, whereas only one converter module should be disabled/enabled according the curve of FIG. 2.

This conflict may be solved by making a single criterion including both criteria for reducing thermal cycling and minimising operational hours. For example, if one converter module out of 3 disabled converter modules needs to be enabled, a criterion being calculated as the sum of a parameter related to thermal cycling and a parameter related to operational hours may be calculated for each of the 3 disabled converter modules in order to determine which one converter module 20 should be enabled.

When a decision has been made to disable a converter module, it has to be decided whether the disabling should be a long term or a short term disabling. If the disabling should be a short term disabling, it is sufficient to change the state of the converter module 20 from the run-state to the ready-state as described previously. If the disabling should be a long term disabling, the state of the converter module 20 is changed from the run-state to the off-state.

The decision of whether the disabling should be a short term disabling or a long term disabling may be decided upon from statistical calculations based on information including:

Weather conditions such a wind velocity and ambient temperatures, weather forecasts, expected future power consumption of users of electric power connected to the utility grid, and recent data related to operation hours and thermal cycling of the converter module 20 to be disabled.

The invention claimed is:

1. A method for operating a converter system of a wind turbine, said converter system comprising
a plurality of converter modules capable of converting a variable amount of electric power produced by a generator to electric power applicable to a utility grid, wherein said plurality of converter modules being configured in parallel, and wherein the method comprises the step of
determining an enabling/disabling procedure of at least one of the converter modules in response to a parameter related to the variable amount of electric power being produced by the generator.

2. A method according to claim 1, wherein the parameter related to the variable amount of electric power being produced by the generator may be selected from the group comprising: temperatures of components of the converter module, a power reference (Sref) being the reference for the apparent power to the converter system, a power reference (Pref) being the reference for the active power to the converter system, a current reference (Iref) being a current reference to the converter system, a measured value (Smes) of the apparent power produced by the generator, a measured value (Pmes) of the active power produced by the generator, and a measured value (Imes) of the current produced by the generator.

3. A method according to claim 1, wherein a disabling of at least one of the converter modules may be a short term disabling, said short term disabling being characterised by the at least one converter module being in a ready-state allowing a fast enabling of the converter module being short term disabled, wherein a fast enabling is defined relative to the time required for operating contactors (Kgen, Kgrid, Kcharge).

4. A method according to claim 1, wherein a disabling of a least one of the converter modules may be a long term disabling, said long term disabling being characterised by the at least one converter module being in an off-state, only allowing a slow enabling the converter module being long term disabled, wherein a slow enabling is defined relative to the time required for fast enabling of converter modules.

5. A method according to claim 1, wherein the step of determining the enabling/disabling procedure of at least one of the converter modules is carried out so that the output power of each enabled converter modules is maximised in relation to the rated power of each of the converter modules, preferably carried out so that the output power of each enabled converter modules is at least 80% of the rated output power, more preferred at least 90% of the rated power.

6. A method according to claim 1, wherein the step of determining the enabling/disabling procedure of at least one of the converter modules is carried out so that the output power of a selected number of enabled converter modules is maximised in relation to the rated power of each of the converter modules, preferably carried out so that the output power of each enabled converter modules is at least 50% of the rated output power, more preferred at least 80% of the rated power.

7. A method according to claim 1, wherein the step of determining the enabling/disabling procedure of at least one of the converter modules is carried out so that the thermal cycling of each of the plurality of converter modules is minimised within a selected range of temperature when operating the converter modules, possibly carried out so that the temperature amplitude of thermal cycling of each enabled converter modules is minimised.

8. A method according to claim 1, wherein the step of determining the enabling/disabling procedure of at least one of the converter modules is carried out so that the thermal cycling of a selected number of the plurality of converter modules is minimised within a selected range of temperature when operating the converter modules and carried out so that the temperature amplitude of thermal cycling of the selected number of enabled converter modules is minimised.

9. A method according to claims 7, wherein the minimising of temperature amplitude of the thermal cycling is carried out relative to an interval of temperatures between 0 and 125 degrees Celsius, preferably relative to an interval of temperatures between 30 and 125 degrees Celsius, more preferably relative to an interval of temperatures between 60 and 125 degrees Celsius, or even more preferably relative to an interval of temperatures between 60 and 110 degrees Celsius.

10. A method according to claim 1, wherein the step of determining the enabling/disabling procedure of at least one of the converter modules is carried out so that the thermal cycling of each of the plurality of converter modules is minimised within a selected range of temperature when operating the converter modules, possibly carried out so that the frequency of the thermal cycling of each enabled converter modules is minimised, wherein the minimising of the frequency of the thermal cycling preferably is carried out relative to a maximum allowable frequency.

11. A method according to claim 1, wherein the step of determining the enabling/disabling procedure of at least one of the converter modules is carried out so that the thermal cycling of a selected number of the plurality of converter modules is minimised within a selected range of temperature when operating the converter modules and carried out so that the frequency of thermal cycling of the selected number of enabled converter modules is minimised, wherein the minimising of the frequency of the thermal cycling preferably is carried out relative to a maximum allowable frequency of thermal cycling.

12. A method according to claim 1, wherein the step of determining the enabling/disabling procedure of at least one of the converter modules is carried out so that the output power of a selected number of converter modules is maximised simultaneously with the thermal cycling of the selected number of converter modules is minimised, said maximising of output power and said minimising of thermal cycling being effected by calculating a single parameter and optimising said single parameter relative to a preset value, said single parameter being characteristic both of the output power relative to a rated power of a converter module and of the thermal cycling of a converter module.

13. A method according to claim 1, wherein the step of determining the enabling/disabling procedure of at least one of the converter modules is carried out so that the number of operational hours of each of the plurality of converter modules are equalised.

14. A method according to claim 1, wherein the step of determining the enabling/disabling procedure of at least one of the converter modules is carried out so that the number of operational hours of a selected number of the plurality of converter modules are equalised.

15. A method according to claim 1, wherein the step of determining the enabling/disabling procedure of at least one of the converter modules is carried out so that the harmonic voltages generated into the utility grid are minimised by phase shifting the Pulse-Width-Modulation (PWM) patterns of a plurality of converter modules.

16. A method according to claim 1, wherein a criteria for enabling/disabling at least one of the converter modules is determined from predetermined hysteresis parameters, wherein the hysteresis parameters are influenced by the temperature of components of the wind turbine.

17. A method according to claim 1, wherein a criteria for enabling/disabling at least one of the converter modules is determined from predetermined hysteresis parameters, wherein the hysteresis parameters are influenced by the ambient temperature.

18. A method according to claim 1, wherein said plurality of converter modules comprise generator inverters and grid inverters.

19. A method according to claim 18, wherein at least one of the converter modules are enabled by enabling both the generator inverter and the grid inverter.

20. A method according to claim 18, wherein at least one of the converter modules are disabled for short periods of time by disabling the generator inverter.

21. A method according to claim 18, wherein at least one of the converter modules are disabled for short periods of time by disabling the grid inverter.

22. A method according to claim 18, wherein at least one of the converter modules are disabled for short periods of time by disabling both the generator inverter and the grid inverter.

23. A method according to claim 1, wherein at least one of the converter modules are enabled by enabling the converter module according to a sequence of enabling procedures such as a sequence of enabling states according to the states of a state machine.

24. A method according to claim 1, wherein at least one of the converter modules are disabled for longer periods of time by disabling the converter module according to a sequence of disabling procedures such as a sequence of disabling states according to the states of a state machine.

* * * * *